US007386509B1

(12) United States Patent
Swift et al.

(10) Patent No.: US 7,386,509 B1
(45) Date of Patent: Jun. 10, 2008

(54) APPARATUS AND METHODS FOR CORRELATING MAGNETIC INDICIA DATA WITH DATABASE RECORDS

(75) Inventors: Amy Swift, Albuquerque, NM (US); Charles Rey Williams, Jr., Pearland, TX (US)

(73) Assignee: Fisrt Date Corporation, Greenwood Village, CA (US)

( * ) Notice: Subject to any disclaimer, the term of this patent is extended or adjusted under 35 U.S.C. 154(b) by 1476 days.

(21) Appl. No.: 10/057,737

(22) Filed: Jan. 25, 2002

(51) Int. Cl.
*G06Q 20/00* (2006.01)
(52) U.S. Cl. ...................................................... 705/39
(58) Field of Classification Search .................. 705/39, 705/45; 235/379
See application file for complete search history.

(56) References Cited

U.S. PATENT DOCUMENTS

| | | | | |
|---|---|---|---|---|
| 4,948,174 A * | 8/1990 | Thomson et al. | ............. | 283/58 |
| 5,121,945 A * | 6/1992 | Thomson et al. | ............. | 283/58 |
| 5,175,682 A | 12/1992 | Higashiyama et al. | | |
| 5,305,196 A * | 4/1994 | Deaton et al. | ................ | 705/10 |
| 5,412,190 A * | 5/1995 | Josephson et al. | ........... | 705/45 |
| 5,444,616 A | 8/1995 | Nair et al. | | |
| 5,504,677 A * | 4/1996 | Pollin | .......................... | 705/45 |
| 5,678,046 A * | 10/1997 | Cahill et al. | ................ | 707/200 |
| 5,679,938 A | 10/1997 | Templeton et al. | | |
| 5,679,940 A * | 10/1997 | Templeton et al. | ........ | 235/380 |
| 5,832,464 A * | 11/1998 | Houvener et al. | ............ | 705/45 |
| 5,878,337 A * | 3/1999 | Joao et al. | .................. | 455/406 |
| 5,896,298 A * | 4/1999 | Richter | ....................... | 700/231 |
| 5,925,865 A * | 7/1999 | Steger | ......................... | 235/379 |
| 6,041,315 A * | 3/2000 | Pollin | .......................... | 705/45 |
| 6,072,894 A * | 6/2000 | Payne | ......................... | 382/118 |
| 6,164,528 A * | 12/2000 | Hills et al. | ................. | 235/379 |
| 6,189,785 B1 * | 2/2001 | Lowery | ...................... | 235/379 |
| 6,243,689 B1 * | 6/2001 | Norton | ......................... | 705/18 |
| 6,283,366 B1 * | 9/2001 | Hills et al. | ................... | 235/379 |
| 6,647,376 B1 * | 11/2003 | Farrar et al. | .................. | 705/45 |
| 6,757,664 B1 * | 6/2004 | Cardinal et al. | ............. | 705/38 |
| 6,816,608 B2 * | 11/2004 | Cato | .......................... | 382/138 |
| 7,016,876 B1 * | 3/2006 | Lanier et al. | ................. | 705/45 |
| 7,068,832 B1 * | 6/2006 | Price et al. | ................. | 382/137 |
| 7,103,579 B1 * | 9/2006 | Phillips et al. | ................ | 705/77 |
| 7,131,571 B2 * | 11/2006 | Swift et al. | ................. | 235/375 |
| 7,246,740 B2 * | 7/2007 | Swift et al. | ................. | 235/379 |
| 2002/0103756 A1 * | 8/2002 | Andrews et al. | ............. | 705/42 |

(Continued)

OTHER PUBLICATIONS

O'Leary, "Personal checks join digital revolution;" Bangor Daily News. Bangor, ME.: Jan. 6, 2001.*

*Primary Examiner*—James A Kramer
*Assistant Examiner*—Jared W. Newton
(74) *Attorney, Agent, or Firm*—Sutherland Asbill & Brennan LLP (57) ABSTRACT

The present invention is related to methods and apparatus for locating information related to a check drafter. In one embodiment, a communication is received indicating that a first check drafted by a drafter failed to clear. The communication includes an identifier. A first database transaction record is located using the identifier as a search key. The first database transaction record includes transaction information related to the first check, the transaction information including at least a first separate drafter identifier. At least the first separate drafter identifier is read from the first database record, and at least a portion of the first separate drafter identifier is provided to a first recipient.

30 Claims, 4 Drawing Sheets

U.S. PATENT DOCUMENTS

2003/0033252 A1* 2/2003 Buttridge et al. ............. 705/45
2003/0050892 A1* 3/2003 Clynes et al. ................. 705/45
2003/0132281 A1* 7/2003 Jones et al. ................. 235/379
2003/0182214 A1* 9/2003 Taylor ......................... 705/35
2003/0218061 A1* 11/2003 Filatov ....................... 235/379
2003/0222135 A1* 12/2003 Stoutenburg et al. ....... 235/379
2004/0078311 A1* 4/2004 Robinson ..................... 705/35
2007/0029376 A1* 2/2007 Stoutenburg et al. ....... 235/379

* cited by examiner

| First name | Last name | Middle name or initial | Street address | City | State | BN number | DL number | DL expiration date | Birth date |
|---|---|---|---|---|---|---|---|---|---|
| John | Doe | E. | 1234 Street Dr. | Phoenix | AZ | BN1111111111111111 | CFA2222222 | 20021120 | 19721120 |
| Jane | Doe | Alice | 4321 Avenue Dr. | San Altos | CA | BN2222222222222222 | CFA1111111 | 20041120 | 19511010 |

FIG. 3

APPARATUS AND METHODS FOR CORRELATING MAGNETIC INDICIA DATA WITH DATABASE RECORDS

BACKGROUND OF THE INVENTION

1. Field of the Invention

The present invention relates to processing magnetic indicia, and in particular, to methods and apparatus for correlating magnetic indicia for or stored on financial instruments with database records.

2. Description of the Related Art

Checks are one of the most common forms of making non-cash payment. However, the processing of physical checks can be manually intensive. It has therefore become common for checks to be electronically processed using electronic check acceptance (ECA) systems. For example, when a customer makes a purchase at a merchant's point of sale terminal, the cashier scans the magnetic ink character recognition (MICR) data, typically in the form of characters or indicia printed at the bottom of a check, using a check reader terminal. The MICR characters typically include the customer's checking account number. In addition, the MICR characters can include the drawee bank's transit or routing number, and the check sequence number.

The cashier manually enters the check amount using the point of sale terminal. The cashier may also capture an image of the check. The checking account number, other MICR data, the check amount, and other transaction related information may be sent to a check processing service. The check processing service then submits the MICR data, including checking account number, check amount and other related information to a check clearinghouse, such as the Automated Clearing House Network (ACH), which provides for the inter-bank clearing of electronic payments for participating depository financial institutions. The customer and/or check processor may first have to give authorization to have the check converted to an electronic check for ACH use. The clearinghouse instructs the issuing bank on which the check is drawn to deposit the necessary funds in the merchant's bank. The customer's account is then debited for the amount of the check by the debited bank and the merchant's account in correspondingly credited by the merchant's bank.

Unfortunately, the customer's account may have insufficient funds to cover the check, the check may have been stopped, or the account may have been closed. In such instances, or for other problems, the check is returned as non-payable by the issuing bank. Using conventional techniques, it is often difficult and/or expensive to locate the customer so as to obtain payment in lieu of or to cover the check. This is particularly true for checks that have been processed using ECA systems as the check processing service often does not have an image of the check with the customer's personal information. The check processing service will merely be informed that the check has not been honored and will be provided with the MICR information of the dishonored check. The check processing service does not know the personal identity of the person who wrote the dishonored check in order to seek payment. Thus, checks often go uncollected, resulting in significant financial loses on the part of merchants or check guarantors.

SUMMARY OF THE INVENTION

Embodiments of the present invention are directed to processing magnetic indicia, and in particular, to methods and apparatus for correlating magnetic indicia located on financial instruments with database records.

In one embodiment, the present invention provides methods and apparatus that utilize MICR (magnetic ink character recognition) data to locate personal identification information associated with the check drafter. Knowing the personal identification information aids in efficiently locating or contacting the check drafter when, for example, a check is declined by a bank on which the check is drawn. Once the check drafter is located or contacted, payment can be sought in lieu of or to cover the declined check. Thus, the present invention advantageously enables a higher rate of check coverage with resulting financial benefits to merchants and/or check guarantors.

In one example embodiment, a customer submits a check to a merchant in a first transaction. The merchant collects MICR data associated with the check by utilizing a MICR reader to read the check's MICR indicia or characters. Alternatively, the merchant can manually enter the data using a transaction terminal keypad. The MICR data can include the customer's checking account number, the drawee bank's transit or routing number, and the check sequence number. The merchant further collects personal identification information associated with the customer. The personal identification information can include, by way of example, one or more of a driver license number, a social security number, a phone number, a physical address, or an email address. In one embodiment, the customer's driver's license or other government issued ID includes a magnetic stripe or bar code, which may store the customer's name, address, driver license or other identification number, driver license expiration date, the customer's birth date, and/or other data. The merchant utilizes a magnetic stripe reader or bar code reader to respectively scan the stripe or bar code and collect the data stored on the stripe or in the bar code. Optionally, rather than using a magnetic stripe or bar code reader, the merchant can enter the personal identification information, customer name, and/or address using the transaction terminal keypad.

The MICR data and the personal identification information are transmitted to a check acceptance system. The check acceptance system stores the MICR data and/or a unique transaction identifier in association with the personal identification information in a comma-delimited file or in a first relational transaction database record or set of records. The first record can further store other transaction-related information, such as a subscriber code that can be used to uniquely identify a merchant or a particular merchant store, such as the store that accepted the check from the customer. The check acceptance system then electronically submits the check to a clearinghouse. The clearing house instructs the customer's bank to debit the customer's account If the check is declined by the customer's bank, a notification is transmitted to the check acceptance system. The notification includes the check's MICR data, such as the customer's checking account number, customer bank's transit or routing number, and optionally the check sequence number and a unique transaction identifier.

The check acceptance system then uses the unique transaction identifier, and/or all or portions of the MICR data, such as the routing number and account number, as a search key to locate the first transaction record stored in the transaction database or file. The associated personal identification information is then read from the first transaction record. The personal identification information can then be used to locate and/or contact the customer to seek payment to cover the check.

In one embodiment, all or portions of the personal identification information read from the first record is used as a search key to locate other transaction records for transactions where at least portions of the personal identification information provided by the customer is the same as in the first transaction. The information stored in the other transaction records can provide further information on where the customer is located or on how to contact the customer.

For example, the personal identification information can include the customer's driver's license number or other government issued identifier, the customer's address and/or current phone number. Thus, the customer's driver's license or other government issued identifier is stored in the first transaction record can be used to locate other transaction records. These other transaction records may include information that discloses the customer's most or more current phone number. In addition, the merchant subscriber code stored in the other transaction records can be used to locate the physical location of the store where the transaction took place, which may indicate generally the city or state where the customer is currently located.

In another embodiment of the present invention, information related to a check transaction customer is located as follows. A communication is received indicating that a first check transaction initiated by a customer failed to clear. The check may have failed to clear because the account on which the check is drawn has insufficient funds, the account is closed, the account is frozen, the ACH is not authorized, and/or for other conditions. The communication includes an identifier. A first database transaction record is located using the identifier as a search key. The first database transaction record includes transaction information related to the first check transaction, the transaction information including at least a first separate customer identifier. The first separate customer identifier is read from the first database record, and at least a portion of the first separate customer identifier is transmitted to a first recipient.

In still another embodiment of the present invention, information related to a customer is located as follows. A communication is received indicating that a first financial transaction initiated by a customer failed to clear because of an account problem. The communication includes an identifier. A first database transaction record is located using the identifier as a search key. The first database transaction record includes transaction information related to the first financial transaction, the transaction information including at least a first separate customer identifier. The first separate customer identifier is read from the first database record, and at least a portion of the first separate customer identifier is transmitted to a first recipient.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF PREFERRED EMBODIMENTS

Embodiments of the present invention are directed to processing magnetic data. In particular, embodiments of the present invention are directed to methods and apparatus for correlating data located on financial instruments, such as checks or check cards, with database records having personal or separate identifier information stored therein.

In particular, one embodiment of the present invention is related to utilizing check MICR (magnetic ink character recognition) data and/or a transaction identifier to locate separate or personal identification information associated with the check drafter. The personal identification information can advantageously aid in efficiently locating or contacting the check drafter. This is particularly useful when processing electronic checks, wherein the name and address of the check drafter is not easily available to the electronic check processor. Thus, for example, if an electronic check is declined for insufficient funds, the located personal identification information can be used to contact the customer to request that the customer cover the declined check. Thus, the present invention advantageously enables a higher rate of check collection with resulting financial benefits to merchants and/or check guarantors.

Figure 1:
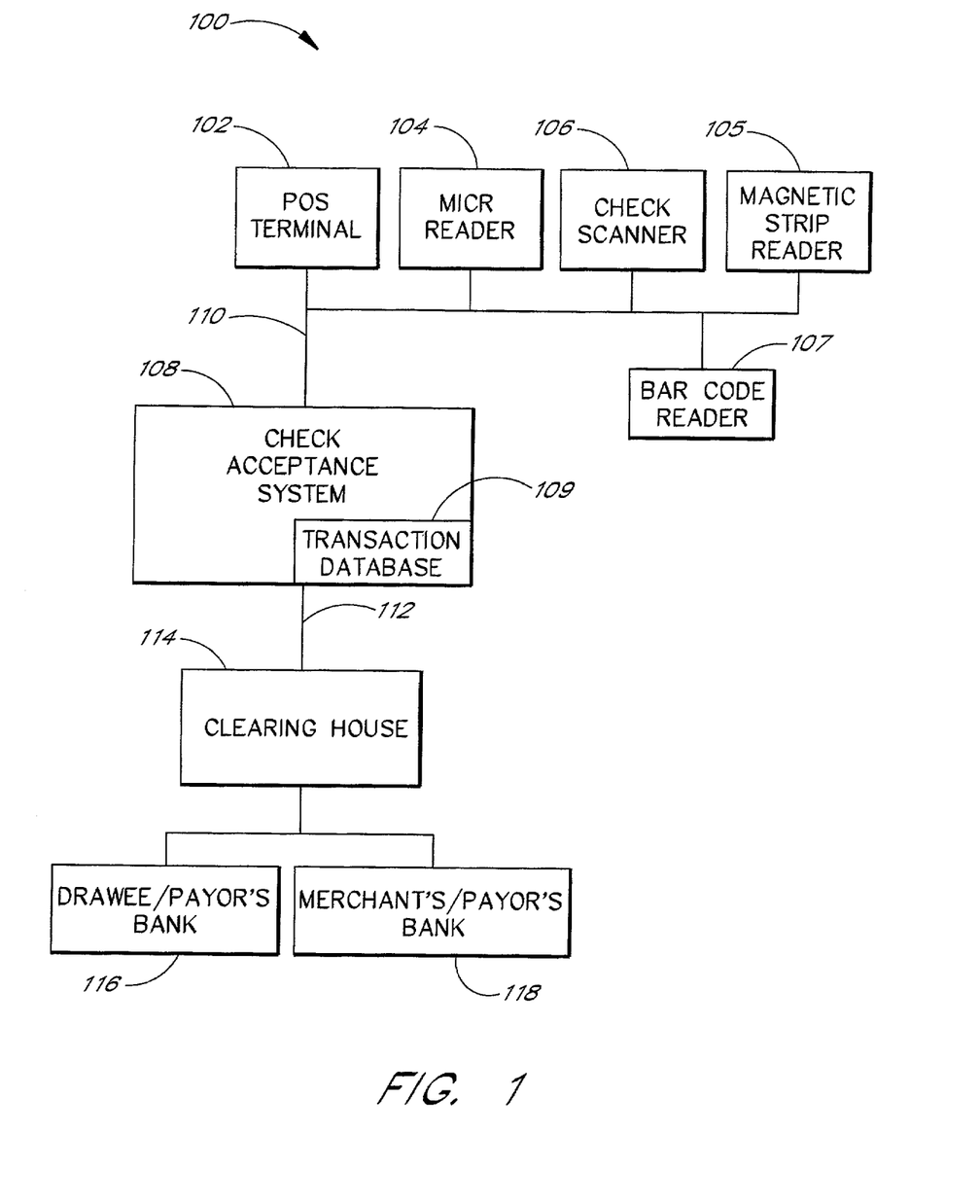
FIG. 1 illustrates an example check processing system.

FIG. 1 illustrates an example check processing system 100 that can be used in accordance with an embodiment of the present invention. A point of sale (POS) terminal 102, a check MICR reader 104, an optical check scanner 105, and a magnetic stripe reader 106, and a bar code reader 107, are located at a merchant site. While the point of sale (POS) terminal 102, the check MICR reader 104, the optical check scanner 105, and the magnetic stripe reader 106, and bar code reader 107 are shown as physically separate devices, two or more of the devices 102-107 can be integrated into the same housing or transaction terminal. Thus the term transaction terminal as used herein is a device which allows a user to interact with the communication medium 110 and to communicate with other portions of the check processing system 100, such as the POS terminal 102, a computer workstation, a local area network of individual computers, a kiosk, a personal digital assistant, an interactive wireless communications device, an interactive television, or the like.

The POS terminal 102 includes a keyboard for manual data entry and optionally includes a dial-up modem, ISDN modem or other modem for connecting to a communications medium, such as a network 110. The MICR reader 104 includes a magnetic read head (not shown) positioned adjacent a MICR slot (not shown) that is used to read MICR characters on a check. The MICR readings are then converted to digital representations. Alternatively, the MICR characters can be read optically using a scanner and optical character recognition (OCR).

The magnetic stripe reader 106 includes a magnetic read head (not shown) positioned adjacent a card swipe slot that is used to electronically read a magnetic stripe on an identification card, such as a driver's license, state identification card, bank card, or the like. The bar code reader 107 includes a laser or other light emitting device that is used to scan light across a bar code, such as a bar code that contains a personal identifier, and an optical sensor used to read the bar code.

The devices 102-107 are networked to a check acceptance system 108 via the communications medium 110. The communications medium 110 can be a private network or a public wide area network, such as the Internet. In other embodiments, the communications medium 110 can be any communication system including by way of example, telephone networks, wireless data transmission systems, two-way cable systems, customized computer networks, interactive kiosk networks, automatic teller machine networks, interactive television networks, and the like. The check acceptance system 108 includes a host computer and transaction database 109, located on a server system, used to log and store transaction information. The term computer, as used herein, comprises one or more computers. The computers comprise, by way of example, processors, program logic, or other substrate configurations representing data and instructions, which operate as described herein. In other embodiments, the processors can comprise controller circuitry, processor circuitry, processors, general purpose single-chip or multi-chip microprocessors, digital signal processors, embedded microprocessors, microcontrollers and the like. The term database as used herein can be implemented as a relational database, a flat database, a table stored in computer readable memory, a data file, such as a comma delimited data file, and the like.

Optionally, an operator, or related entity, of the check acceptance system 108 can take or have a financial interest in the check. For example, the operator or related entity may purchase the check from the merchant at a discounted rate. Alternatively, the operator or related entity can guarantee the check for a fee. In this instance, the operator or related entity will cover the check if the check fails to clear.

The check acceptance system 108 includes a host computer and relational transaction database 109, located on a server system, used to log and store transaction information. The transaction database 109 may include 2 or more databases, such as a call detail database, which records cleared check information, and a collections database, which records uncollected check information for checks guaranteed by the check acceptance system. The check acceptance system 108 can be owned or operated by the merchant or by a separate business entity. The check acceptance system 108 is networked via a network 112 to a clearinghouse 114, such as the Automatic Clearinghouse (ACH), the Federal Reserve, a private clearing house or the like. The clearinghouse 114 is in turn networked to a plurality of banks, including a drawee's or payor's bank 116 with which a customer has a checking account, and a bank 118 with which the merchant has an account. The term "bank" as used herein includes banks, saving & loan institutions, thrifts, and other financial institution that offer accounts on which a check may be issued. In other embodiments, a clearinghouse is not used as part of the check processing system 100 and the check acceptance system 108 interfaces directly with the banks 116, 118.

When a payor, such as a customer, desires to make a purchase or complete a transaction using a check, the customer drafts or completed the check and gives it the merchant's POS operator. A "check" refers to a draft or order for a certain sum of money payable on demand to a certain person or entity named therein or to his order or to bearer. A check is drawn upon a bank or financial institution and purports to be drawn upon a deposit of funds available to the drawer. Thus a check can be a physical, paper check, an electronically processed check, or a check card. The face of a paper check typically includes the drawer's name and address and the name and location of the bank on which the check is drawn. In addition, paper checks include magnetic ink character recognition (MICR) characters or indicia that may be read electronically.

The MICR characters typically include the drawer's account number, the drawee bank's transit or routing number, and the check sequence number. The term "account number" as used herein includes an identifier having only numbers, both numbers and letters, or numbers, letters and/or other symbols. An example standard for the form of the MICR characters and their position along the bottom edge of the check are prescribed by ANSI standards X9.27-2000 and X9.13-1999, respectively, which are published by the American National Standards Institute, Inc.

The POS operator collects a variety of transaction information using one or more terminals, collectively referred to as a transaction terminal. For example, the operator enters transaction information, including the dollar value of the transaction, via the POS terminal 102 keyboard. In addition, the operator scans the check using check MICR reader 104, which reads the MICR indicia. Optionally, the operator optically scans all or portions of the completed check using the optical check scanner 105 and the scanned image or images are stored locally or on a merchant server (not shown) as a digital file, such as a TIFF (tagged image file format) file. For example, the check scanner may scan just the name/address area, the check amount area, and the MICR data area, and then store the images in one or more TIFF files. Advantageously, by storing images of portions of the check, rather than an image of the entire check, the digital files are smaller. Having smaller image files reduces the amount of storage memory needed, and the image files can be transferred faster over a telecom network. Alternatively, a film camera can be used to photograph all or portions of the completed check, wherein the photograph is stored on film. Once the check has been imaged, the physical check may then be given back to the customer or may be stored for future reference by the merchant.

Additional customer identification information may be collected by scanning the magnetic strip on the customer's driver's license, state identification card or other supplementary identification device using the magnetic stripe reader 106. Such data may also be stored using one or more bar codes which are read using the bar code reader 107. The identification information can include one or more personal identifiers associated with the customer, such as the customer's driver's license number, license expiration date, birth date, social security number, address, phone number, email address, toll road transponder ID, and the like. Further, the customer may be asked to key in a personal identification number (PIN) associated with the customer's checking account. Optionally, rather than scanning a card or other identification device, the operator or customer manually enters the identification information using a keyboard coupled to the POS terminal 102.

Some or all of the transaction information is then transmitted using the POS modem or other communication device over the network 110 to the check acceptance system 108. The check acceptance system 108 then stores the information in the transaction database 109. The check acceptance system 108 optionally provides the POS operator authorization to accept or decline the check.

The check processing service then submits the MICR data to the check clearinghouse 114. The submitted MICR data can include the checking account number, routing number, check amount, check number, and other related information. If the account and routing numbers are correct and there are sufficient funds in the customer's account, and if certain other conditions are met, the clearinghouse instructs the customer's bank 116 on which the check is drawn to deposit the necessary funds in the merchant's bank 118. The customer's account is then debited for the amount of the check by the customer's bank 116. If the account number or the routing number is incorrect, or if there are account problems, such as insufficient funds in the customer's account, the account is closed, the account is frozen, a stop payment is issued, an administrative return occurred, the ACH conversion is not authorized, and/or for other conditions, the check will not clear. The operator of the check acceptance system 108 is informed that the check has been declined, why the check was declined, as well as the check account and routing number provided when the check was submitted to the clearing house.

Figure 2A:
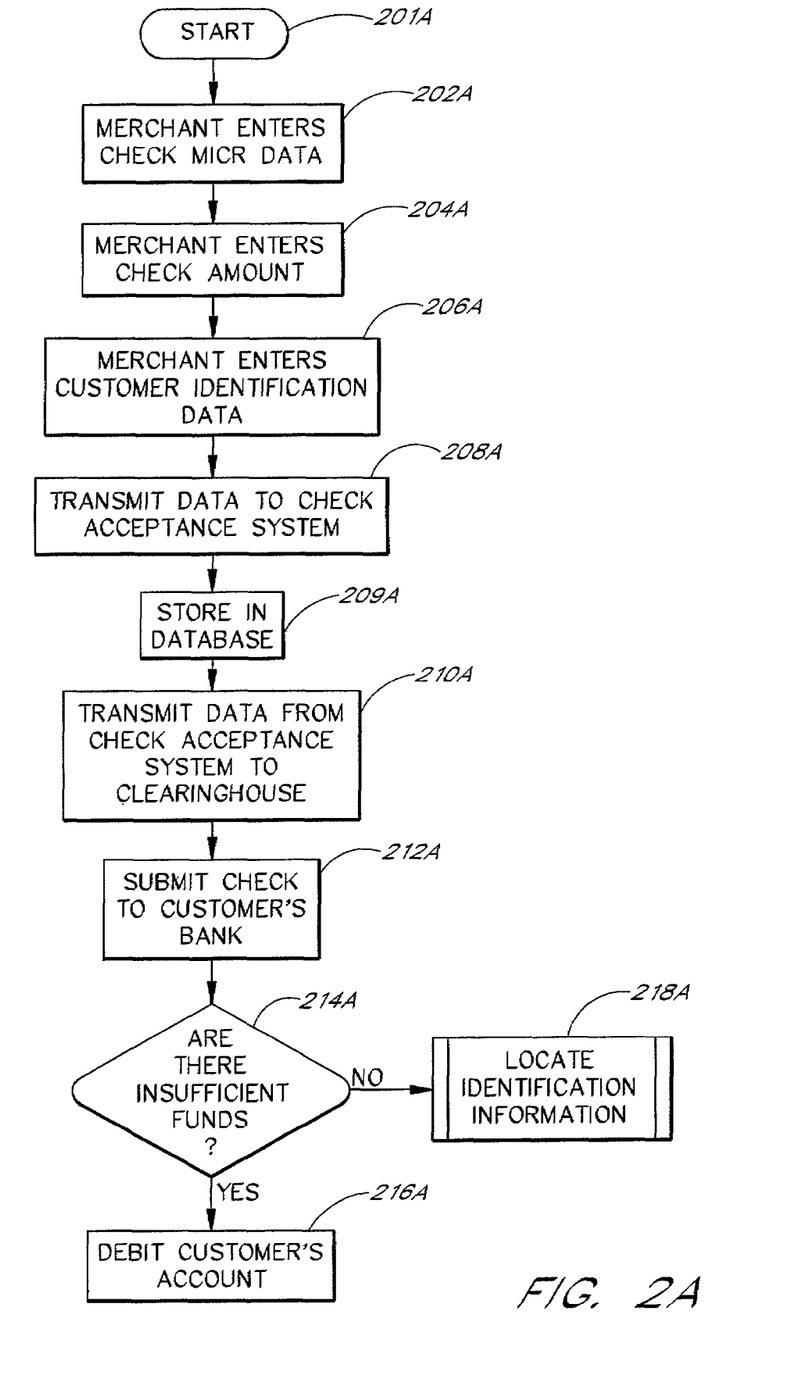
FIG. 2A illustrates an example check processing process.

FIG. 2A is a flow diagram illustrating in greater detail the overall check processing process used to process a customer check transaction. The process 200A can be used with a physically processed check, an electronically processed check, and/or a check or debit card whose use is analogous to a check, and the like. Beginning at state 201A, the process proceeds to state 202A, wherein the merchant enters check data into a transaction terminal. The merchant may initiate a transaction by inserting a first check into the MICR reader or by manually entering the MICR data using a terminal keypad. As discussed above, the MICR characters can also be read optically and converted into text using OCR. In addition, the check account data, bank routing data, and the like can be stored on a magnetic stripe or using a bar code, such as that found on credit cards, debit cards and the like. The magnetic card can be read using magnetic stripe reader positioned in proximity to the transaction terminal's card swipe slot. Similarly, data stored using bar codes can be read using a bar code reader.

If the first check is read by the MICR reader, the transaction terminal will read and store the raw MICR data. At state 204A, the merchant enters the check amount using the terminal's keypad.

Proceeding to state 206A, the merchant enters customer identification data, such as a driver's license number, state identification number, phone number, address, social security number and/or other identifier. If the customer's driver's license or state identification card includes a magnetic stripe or bar code, the license or card can be swiped through the transaction terminal's card swipe slot or read using a bar code reader, and the relevant data, including include the driver's license number, state of issue, and home address will be read and stored. In some instances, the license or state identification card data also includes the customer's name, address and/or phone number. If the license data or other personal identification information is entered manually, the transaction terminal will prompt the merchant to enter the driver's license number, the associated state code, and/or other identification data using the transaction terminal keypad. At state 208A, the data collected by the merchant is transmitted to the check acceptance system. The customer and/or check processor may first have to give authorization to have the check converted to an electronic check for ACH use before this takes state takes place.

At state 209A, the collected data is parsed into its component data parts, including the routing, account, and check sequence numbers, and the parsed data is stored in a first transaction database record with an optional unique record identifier. The check acceptance system stores in association the MICR data and the personal identification information in a first relational transaction database record or set of records. The first record can further store other transaction-related information, such as a subscriber code that can be used to uniquely identify a merchant or a particular merchant store that accepted the first check and/or transmitted the collected information. In another embodiment, the collected data is first stored in a log file. A batch process is then run at a specified time that translates the log file into a comma-delimited file or table. An example transaction table is described below in greater detail with reference to FIG. 3.

At state 210A, using the check MICR data, the check acceptance system electronically submits the first check to a check clearinghouse. At state 212A, some or all of the MICR information is transmitted to the customer's bank. At state 214A, a determination is made as to whether there are sufficient funds in the customer's account to cover the first check. If there are sufficient funds in the account, and if the account number and routing number are correct at state 216A the customer's account is debited and the merchant's account is credited.

Figure 2B:
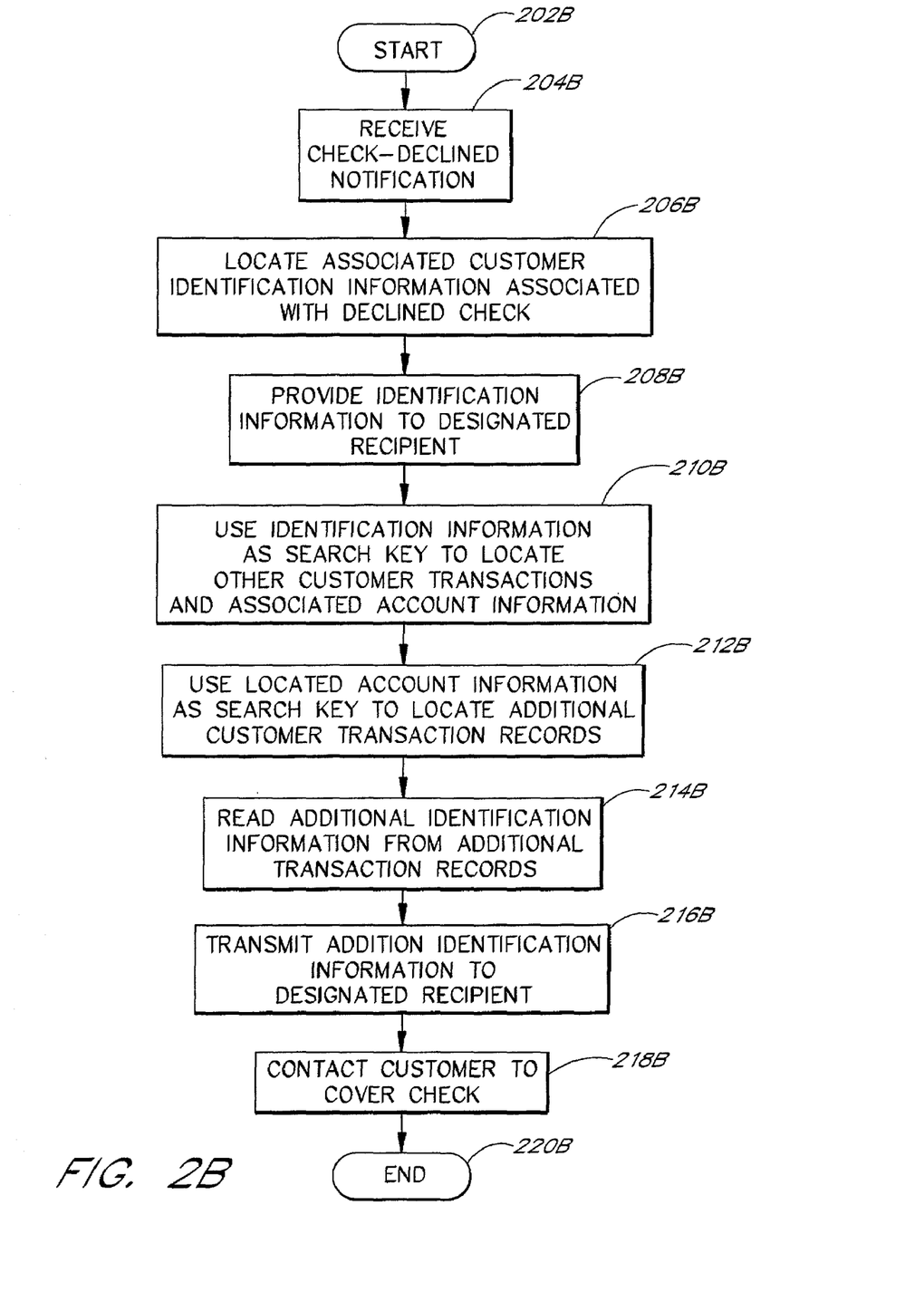
FIG. 2B illustrates a flow diagram illustrating an example embodiment of a personal identifier location process.

If the first check failed to clear because, by way of example, there are insufficient funds in the account the account is closed, the account is frozen, a stop payment is issued, an administrative return, the ACH is not authorized, and/or for other conditions, then at state 218A the customer's personal identification information is located and read by the check acceptance system 110. FIG. 2B illustrates a flow diagram illustrating an example embodiment of the personal identification location process 218A in greater detail.

All or portions of the process 218A can be implemented using program logic. In one embodiment, the program logic may advantageously be implemented as one or more modules. The modules may advantageously be configured to execute on one or more processors. The modules include, but are not limited to, software or hardware components such as software object-oriented software components, class components and task components, processes methods, functions, attributes, procedures, subroutines, segments of program code, instructions, drivers, firmware, microcode, circuitry, data, databases, data structures, tables, arrays, and variables stored in computer readable memory and configured to be executed by a processor. Optionally all of the process 218A can be performed automatically, that is, without human intervention. Alternatively, all or portions of the process 218A can be performed manually.

Figure 3:
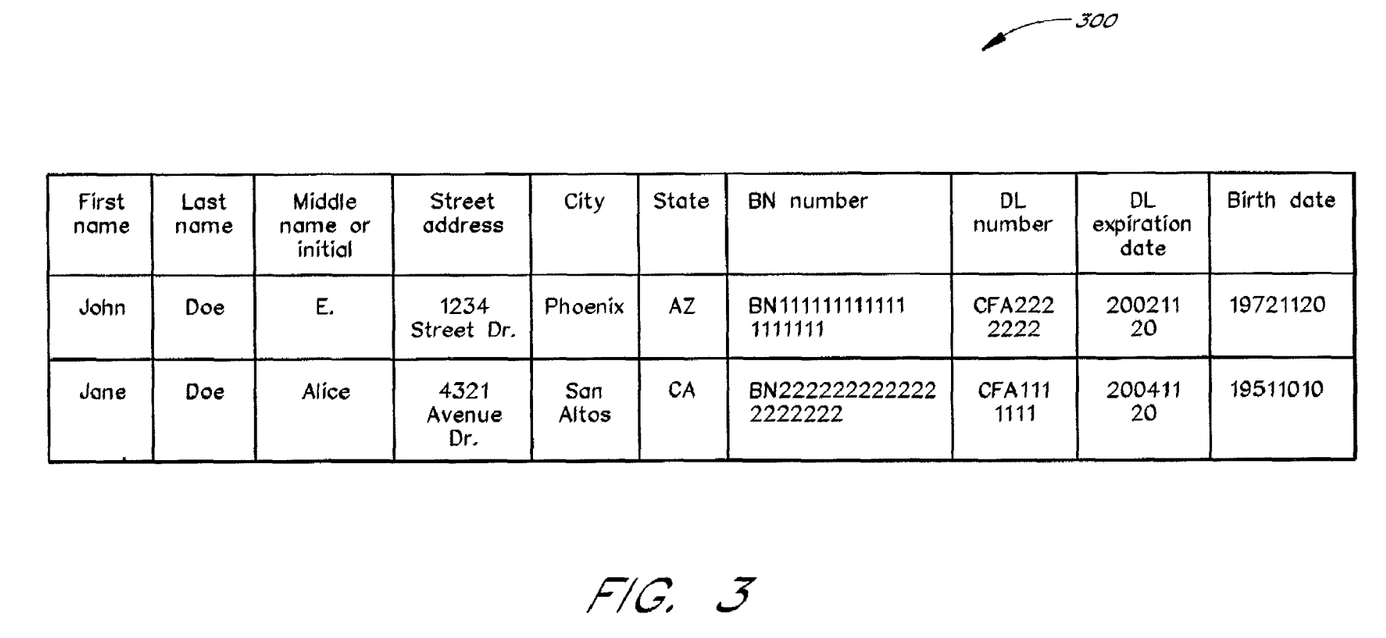
FIG. 3 illustrates a portion of an example transaction table in accordance with one embodiment of the present invention.

Beginning at start state 202B, the process proceeds to state 204B, where a check-declined notification is received. The notification includes the account number and routing number that had been submitted to the clearinghouse, the check number, and the reason the first check was declined, in this case, because there were insufficient funds in the account. At state 206B, the transaction database is searched to locate the customer's personal identifier using the first check's account number and/or routing number as a search key. As discussed below, FIG. 3 illustrates a portion of a transaction database that can be searched using the account number and/or routing number as a search key. As previously discussed, the transaction database can actually include multiple databases, such as a call detail database and a collections database. The previously stored transaction information, including the recorded customer identification information, such as the customer's license number, is retrieved.

At state 208B, the located personal identification information is automatically transmitted or otherwise provided to a designated recipient so that the information can be used to locate or contact the customer so that the customer can cover the check. For example, the personal identification information can be transmitted to the merchant who can then contact or locate the customer. In another example, if the operator of the check acceptance system or related entity has purchased the check or has guaranteed the check, the operator or associated collection entity can use the personal identification information to contact or locate the customer.

At state 210B the identification information or a portion thereof, such as the customer's driver's license number, is then used as a search key to search for and locate other check transactions recorded in the transaction database stored association with the portion of the identification information. Then other identification information is read, such as the customer's address and/or phone number, stored in the other check transaction records. Optionally, the search is limited to check transactions where the check was drafted after the first check was drafted. This enables possibly more recent identification information to be located. Further, additional transaction-related information, such as whether the other checks cleared or were declined, the corresponding check amounts, the corresponding merchant subscriber codes, and the like can be read as well.

At state 212B the first check's account number and/or routing number is used as a search key to search for and locate other check transactions involving checks having the same account and/or routing numbers recorded in the transaction database. The personal identification information, such as driver's license number, address and/or phone number stored in the other check transaction records, is then read at state 214B. Optionally, the search is limited to check transactions where the check was drafted after the first check was drafted. This enables possibly more recent identification information to be located. As similarly discussed above with respect to state 212B, additional transaction-related information, such as whether the other checks cleared or were declined, the corresponding check amounts, the corresponding merchant subscriber codes, and the like can be read as well.

At state 216B the additional personal identification information located at states 210B and 212B, and the additional transaction-related information, are transmitted or otherwise provided to the designated recipient. At state 218B, the customer is contacted based at least in part on at least a portion of the personal identification information and/or the additional transaction-related information located and read at states 208B-214B. The process 218A ends at state 220B.

FIG. 3 illustrates a portion of an example transaction table 300 generated from a portion of the transaction data received as part of an electronic check transaction, such as that described above with reference to FIG. 2. The data may have been read from the magnetic stripe or bar code on a customer's driver's license or other identification card. The transaction table 300 can include information for transactions involving cleared and/or non-cleared checks.

The table can be in the form of a database record or in the form of a comma-delimited file. The example table has 10 columns or fields. The fields are as follows: First name; Last name; Middle Name or Initial; Street address; City; State; BN number; Driver's License (DL) number; Driver's License (DL) Expiration Date; and Birth Date. The BN number is a concatenation of the routing and account number. In addition to the fields previously discussed, a transaction number can also be assigned to each transaction and can be stored in association with the corresponding transaction record using a transaction field. As discussed above with respect to state 206B in FIG. 2B, the transaction database or table can be searched using a non-cleared check's account number and/or routing number as a search key to locate the corresponding customer's personal identifier. Of course other table schema having fewer or additional fields than that shown in FIG. 3 can be used as well. By way of another example, if no personal identifier was received with a non-cleared check at issue, the routing and account number on the non-cleared check can be used as a search term to locate a previous or subsequent processed check, whether or not the previous or subsequent check cleared. If the located check has an associated personal identifier, such as a driver license number, the associated personal identifier can then be associated with the non-cleared check at issue.

Thus, as described above, embodiments of the present invention advantageously provides methods and apparatus for increasing the check coverage rate using check account data, even when a check has failed to clear due to insufficient funds. The higher rate of check collection results in financial and operational benefits for the merchant, the check processor, and/or check guarantor.

While certain embodiments of the inventions have been described, these embodiments have been presented by way of example only, and are not intended to limit the scope of the inventions. Indeed, the novel methods and systems described herein may be embodied in a variety of other forms without departing from the spirit thereof. The accompanying claims and their equivalents are intended to cover such forms or modifications as would fall within the scope and spirit of the inventions.

What is claimed is:

1. A method of correlating magnetic ink character recognition (MICR) data with related check transaction data, the method comprising:
   receiving over a network check MICR data for a first check drafted by a customer, the check MICR data including an account number corresponding to the customer's checking account;
   receiving over the network the customer's driver's license data in association with the check MICR data;
   storing in computer readable memory the check MICR data in association with the driver's license number in a first database record;
   electronically submitting the check for settlement, the submission including at least a portion of the check MICR data;
   receiving a communication indicating that the check failed to clear, the communication including at least the account number;
   locating the first database record using the account number as at least a portion of a first search key when the check failed to clear;
   using the customer's driver's license data to search for other check transactions, subsequent to the check transaction, in a transaction database to obtain additional identification information or transaction information; and
   reading the driver's license data from the first database record; and
   transmitting at least a portion of the driver's license data and any additional identification or transaction information to a recipient.

2. The method as defined in claim 1, wherein the driver's license data includes a driver's license number.

3. The method as defined in claim 1, wherein the driver's license data includes an address associated with the customer.

4. The method as defined in claim 1, wherein the first search key includes at least the account number and a routing number.

5. The method as defined in claim 1, further comprising:
locating a second database record using at least a portion of the driver's license data from the first database record; wherein at least a portion of the driver's license data is used as at least a portion of a second search key;
reading the second database record; and
transmitting at least a portion of the second database record to the recipient.

6. The method as defined in claim 1, further comprising:
locating a second database record using at least the account number from the first database record, wherein at least a portion of the driver's license data is used as at least a portion of a second search key;
reading the second database record; and
transmitting at least a portion of the second database record to the recipient.

7. The method as defined in claim 1, further comprising:
storing a merchant identifier in the first database record; and
transmitting the merchant identifier to the recipient.

8. The method as defined in claim 1, further comprising locating the customer based at least in part on the portion of the driver's license data transmitted to the recipient.

9. A method of locating information related to a check transaction customer, the method comprising:
receiving a communication indicating that a check transaction initiated by a customer failed to clear, the communication including at least an identifier;
locating a first transaction record using the identifier when the failed check transaction failed to clear, the first transaction record including transaction information related to a transaction by the customer, the transaction information including at least a first separate customer identifier;
using the customer identifier to search a transaction database for check transactions subsequent to the check transaction to obtain additional identification or transaction information; and
reading at least the first separate customer identifier from the first transaction record; and
transmitting at least a portion of the first separate customer identifier to a recipient.

10. The method as defined in claim 9, wherein the customer is contacted based at least in part on the portion of the first separate customer identifier.

11. The method as defined in claim 9, wherein the first separate customer identifier is a checking account number.

12. The method as defined in claim 9, wherein the first separate customer identifier includes information from a driver's license.

13. The method as defined in claim 9, wherein the recipient is a merchant who is the designated payee with respect to the failed check transaction.

14. The method as defined in claim 9, wherein the recipient is a guarantor of payment with respect to the failed check transaction.

15. The method as defined in claim 9, wherein the first transaction record further includes a check transaction amount.

16. The method as defined in claim 9, wherein the first transaction record further includes a merchant identifier that identifies to whom a check used in the failed check transaction was drawn to.

17. The method as defined in claim 9, wherein the failed check transaction is performed using a check card.

18. The method as defined in claim 9, wherein the failed check transaction is performed using a paper check.

19. The method as defined in claim 9, wherein the failed check transaction is performed using an electronic check.

20. A method of locating information related to a check user, the method comprising:
receiving a communication indicating that a check drawn on an account by a user failed to clear, the communication including at least account information;
locating, when the failed check failed to clear, a record using the account information, the record including transaction information related to a check, the transaction information including a personal identifier for the user;
using the personal identifier to search a transaction database for additional check transaction subsequent to the failed check transaction to obtain additional identification or transactional information; and
reading at least the personal identifier from the record; and
providing information related to the personal identifier to a recipient.

21. The method as defined in claim 20, wherein the failed check includes MICR data.

22. The method as defined in claim 20, wherein the failed check is in the form of a check card that includes a magnetic stripe that stores an account number.

23. The method as defined in claim 20, wherein the failed check is in the form of a check card that includes a bar code that stores an account number.

24. The method as defined in claim 20, wherein at least a portion of the account information was optically read from the failed check.

25. The method as defined in claim 20, wherein at least a portion of the account information was manually entered by a point of sale terminal operator.

26. An apparatus for locating information related to a check drafter, the apparatus comprising:
a first instruction stored in computer readable memory, the first instruction configured to receive a communication indicating that a check drawn on an account by a drafter was not honored, the communication including at least an identifier;
a second instruction stored in computer readable memory, the second instruction configured to locate, using the identifier, a first database record, the first database record including transaction information related to a first check, the transaction information including personal identification information for the drafter of the first check;
a third instruction stored in computer readable memory, the third instruction configured to read at least a portion of the personal identification information from the first database record; and
a fourth instruction stored in computer readable memory the fourth instruction configured to search a transactional database for additional check transactions subsequent to the first check transaction for additional identification or transactional information; and
a fifth instruction stored in computer readable memory, the fifth or transactional information instruction configured to provide at least the portion of the personal identification or transactional information to a recipient.

27. The apparatus as defined in claim 26, further comprising:
a merchant identifier stored in the first database record, wherein the merchant identifier is transmitted to the recipient.

28. The apparatus as defined in claim 26, wherein the check is in the form of an electronic check.

29. The apparatus as defined in claim 26, wherein the check is in the form of a check card.

30. The apparatus as defined in claim 26, wherein the check is in the form of a paper check.

* * * * *

UNITED STATES PATENT AND TRADEMARK OFFICE
CERTIFICATE OF CORRECTION

PATENT NO. : 7,386,509 B1  Page 1 of 1
APPLICATION NO. : 10/057737
DATED : June 10, 2008
INVENTOR(S) : Swift et al.

It is certified that error appears in the above-identified patent and that said Letters Patent is hereby corrected as shown below:

On the Title Page, Item (73)

In the listing of Assignee:

"First Date Corporation" should be changed to --First Data Corporation--

Column 10, Line 41 – Insert --first-- before "check"

Column 10, Line 44 – Insert --first-- before "check"

Column 10, Line 49 – Insert --first-- before "check"

Column 10, Line 51 – Insert --first-- after "the"

Column 12, Line 14 – Change "transaction" to --transactions--

Column 12, Line 53 – Insert a comma after "memory"

Signed and Sealed this

Ninth Day of September, 2008

JON W. DUDAS
*Director of the United States Patent and Trademark Office*